(12) United States Patent
Shaw et al.

(10) Patent No.: US 10,851,922 B2
(45) Date of Patent: Dec. 1, 2020

(54) ADJUSTABLE COLLAR

(71) Applicant: Centrotherm Eco Systems, LLC, Albany, NY (US)

(72) Inventors: Kevin Shaw, Albany, NY (US); Ralf Liese, Brilon (DE)

(73) Assignee: CENTROTHERM ECO SYSTEMS, LLC, Albany, NY (US)

(*) Notice: Subject to any disclaimer, the term of this patent is extended or adjusted under 35 U.S.C. 154(b) by 168 days.

(21) Appl. No.: 16/177,157

(22) Filed: Oct. 31, 2018

(65) Prior Publication Data

US 2020/0132230 A1 Apr. 30, 2020

(51) Int. Cl.
*F16L 25/14* (2006.01)
*F16L 27/08* (2006.01)
*F16L 25/06* (2006.01)

(52) U.S. Cl.
CPC .............. *F16L 25/14* (2013.01); *F16L 25/06* (2013.01); *F16L 27/08* (2013.01)

(58) Field of Classification Search
CPC . F16L 25/14; F16L 27/08; F16L 25/06; F16L 21/03; F16L 21/08; F16L 37/101; F23J 2213/203; F23J 13/04; F23J 13/00
USPC ................ 285/358, 359, 360, 394, 395, 396
See application file for complete search history.

(56) References Cited

U.S. PATENT DOCUMENTS

| | | | | |
|---|---|---|---|---|
| 4,787,657 A | * | 11/1988 | Henniger | F16L 5/06 285/323 |
| 4,878,695 A | * | 11/1989 | Whitham | F16L 37/252 285/39 |
| 6,557,900 B1 | * | 5/2003 | Austin | F16L 19/005 285/354 |
| 7,722,091 B1 | * | 5/2010 | Brockington | E03F 1/008 285/361 |
| 2018/0119953 A1 | * | 5/2018 | Sugatani | F16L 19/065 |

FOREIGN PATENT DOCUMENTS

EP 2966351 1/2016 ............... F23J 13/04

* cited by examiner

*Primary Examiner* — James M Hewitt, II
(74) *Attorney, Agent, or Firm* — Hayes Soloway P.C.

(57) ABSTRACT

An adjustable collar for inserting a pipe therein, in particular for positioning and securing a pipe to an apparatus. The adjustable collar accepts pipes of any diameter within a pre-determined range instead of only accepting pipes of certain standard diameters. Furthermore, pipes can be secured into the adjustable collar according to the invention without the need for hand tools, adapters, or other accessories.

12 Claims, 10 Drawing Sheets

ADJUSTABLE COLLAR

The present invention relates to an adjustable collar for inserting a pipe therein, in particular for positioning and securing a pipe to an apparatus.

INTRODUCTION

It is common in the construction industry to have apparatuses that can use variously sized pipe and materials. This often requires equipment such as adapters, increasers, reducers, and the like.

For instance, EP 2 966 351 discloses an adapter for a flue gas outlet, which is suitable to accommodate a number of often used pipe diameters. The disadvantage of this adapter is that it is designed to accommodate only predetermined pipes of standard diameters. The adapter is not suitable to accommodate pipes that have a different diameter than these predetermined pipes. In addition, tightening pipes into this adapter requires tools. Moreover, pipes inserted into this adapter are eccentric with respect to the inlet of the adapter, which is detrimental for gas flow.

SUMMARY OF THE INVENTION

In a first aspect the invention relates to an adjustable collar for inserting a pipe therein, comprising a housing with a first open end and a second open end; at least two sizing clamps, radially movably mounted at said first open end, and having a first end and a second end; a control ring rotatably mounted at said first open end, and having a first end and a second end; and one or more clamp guides configured to receive the sizing clamps and defining an allowed movement range for the sizing clamps; wherein one of the first and second ends of the control ring and one of the first and second ends of the sizing clamps are in contact with each other, wherein at the contact side of said control ring and sizing clamps, one of the contacting ends of the control ring and sizing clamps comprises a spiral guide track and the other comprises cooperative guide followers.

In a second aspect the invention relates to a computer-readable medium having computer-executable instructions adapted to cause a 3D printer to print the adjustable collar according to the invention.

The present invention provides an adjustable collar for inserting a pipe therein, which accepts pipes of any diameter within a predetermined range instead of only accepting pipes of certain standard diameters. Furthermore, pipes can be secured into the adjustable collar according to the invention without the need for hand tools, adapters, or other accessories.

Moreover, the positioning ability of the sizing clamps keeps an inserted pipe concentrically aligned with the collar of the invention and apparatus outlet to which it is mounted. This is most optimal for flow.

SHORT DESCRIPTION OF THE DRAWINGS

Figure 2:
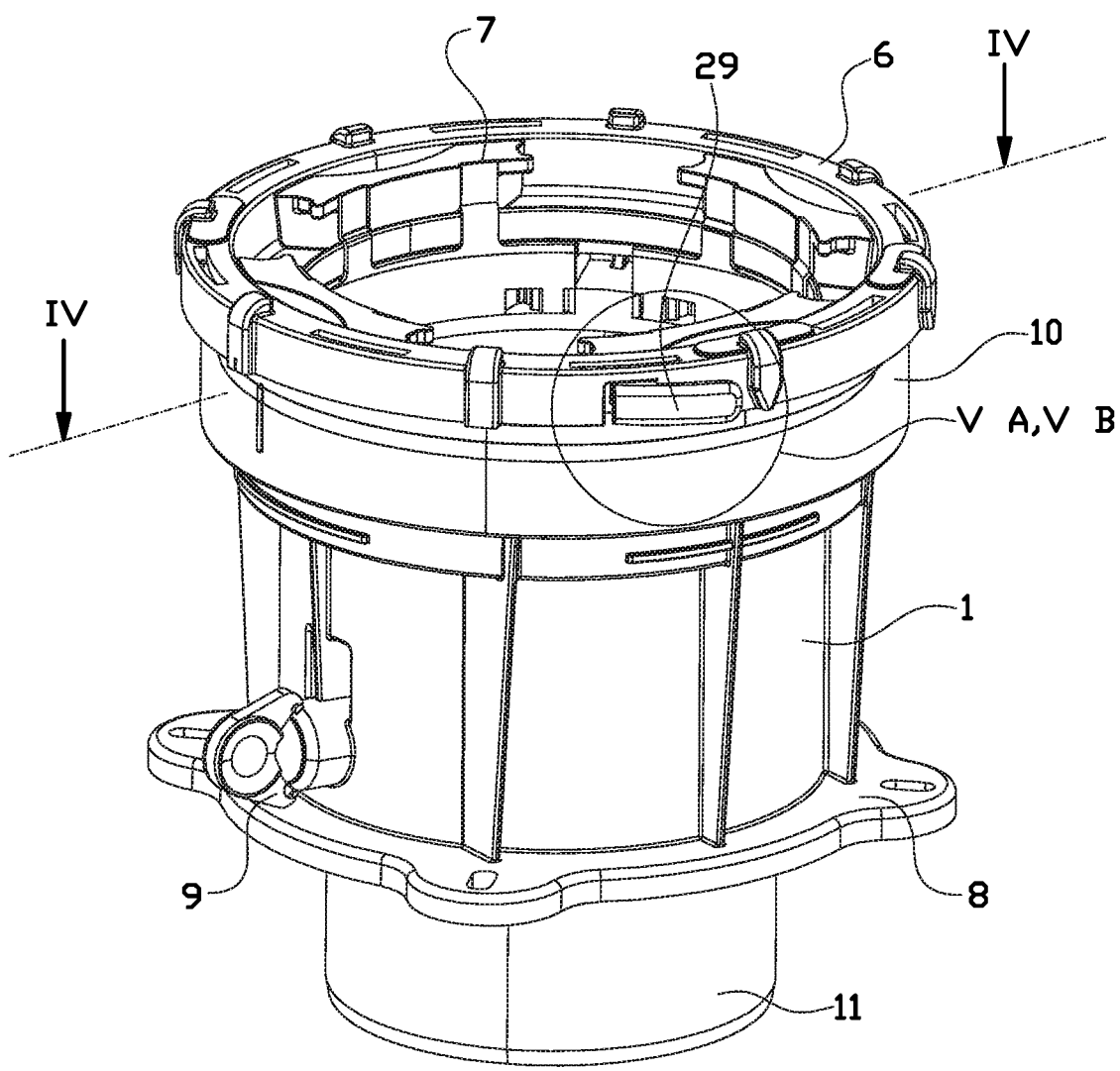
FIG. 2 shows a perspective side view of an exemplary assembled adjustable collar assembled of the components shown in FIG. 1.
Figure 3:
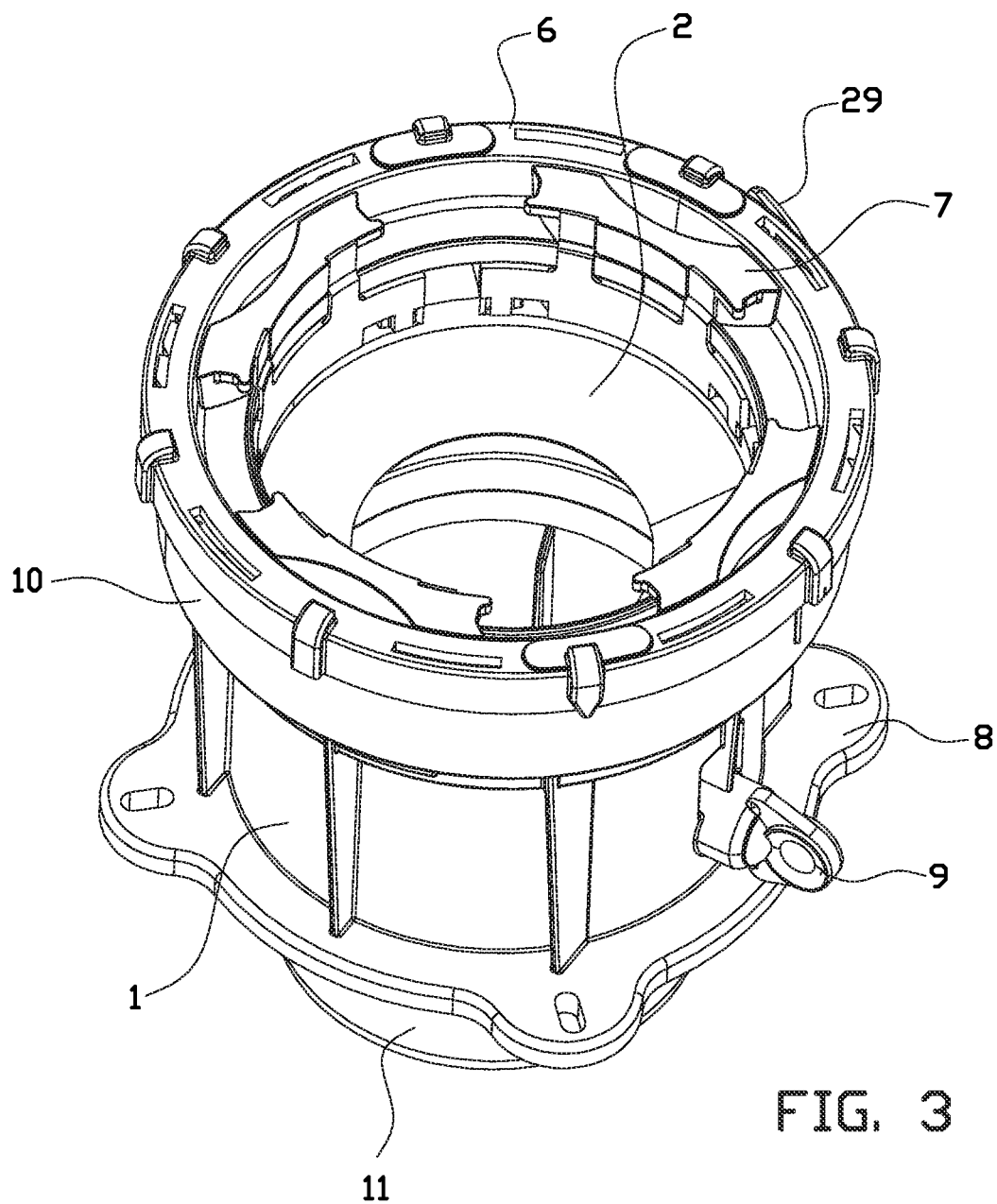
FIG. 3 shows a perspective top view of the exemplary embodiment of the adjustable collar of the invention shown FIG. 2.
Figure 5A:
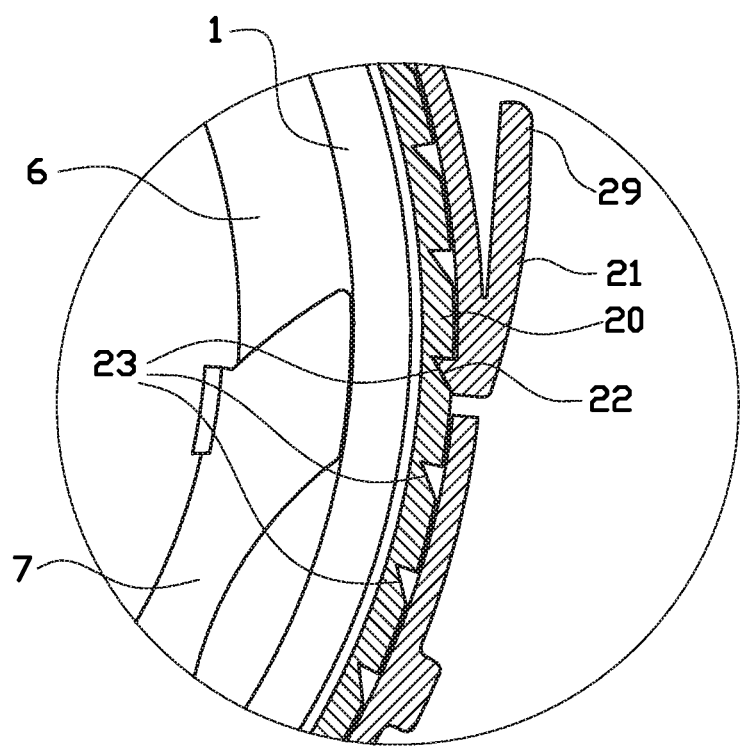
Figure 5B:
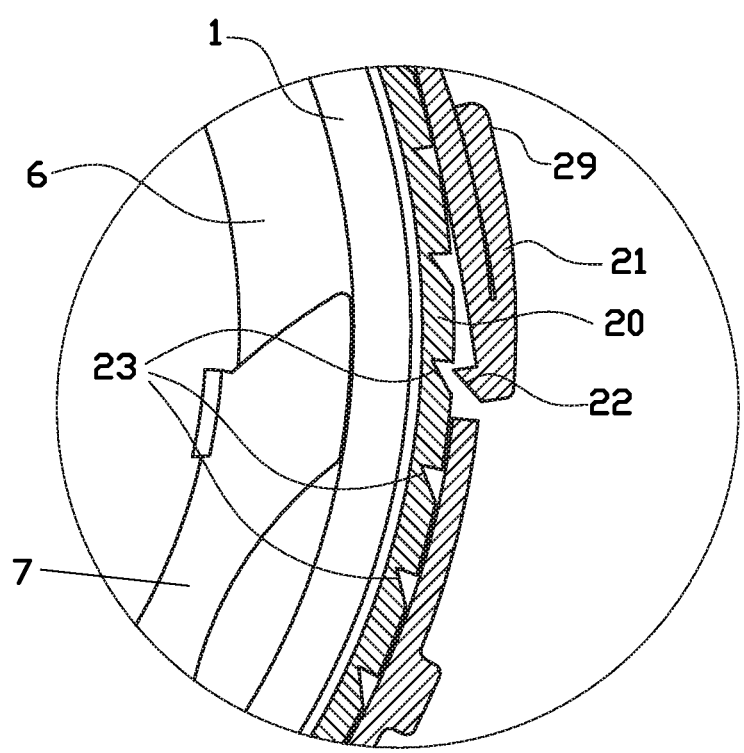

FIG. 5 shows a top view of the securing means of the exemplary embodiment of the adjustable collar of the invention shown in FIG. 2 in area V A, V B in locked and unlocked state. FIG. 5A represents a locked state. FIG. 5B shows the unlocked state.

Figure 1:
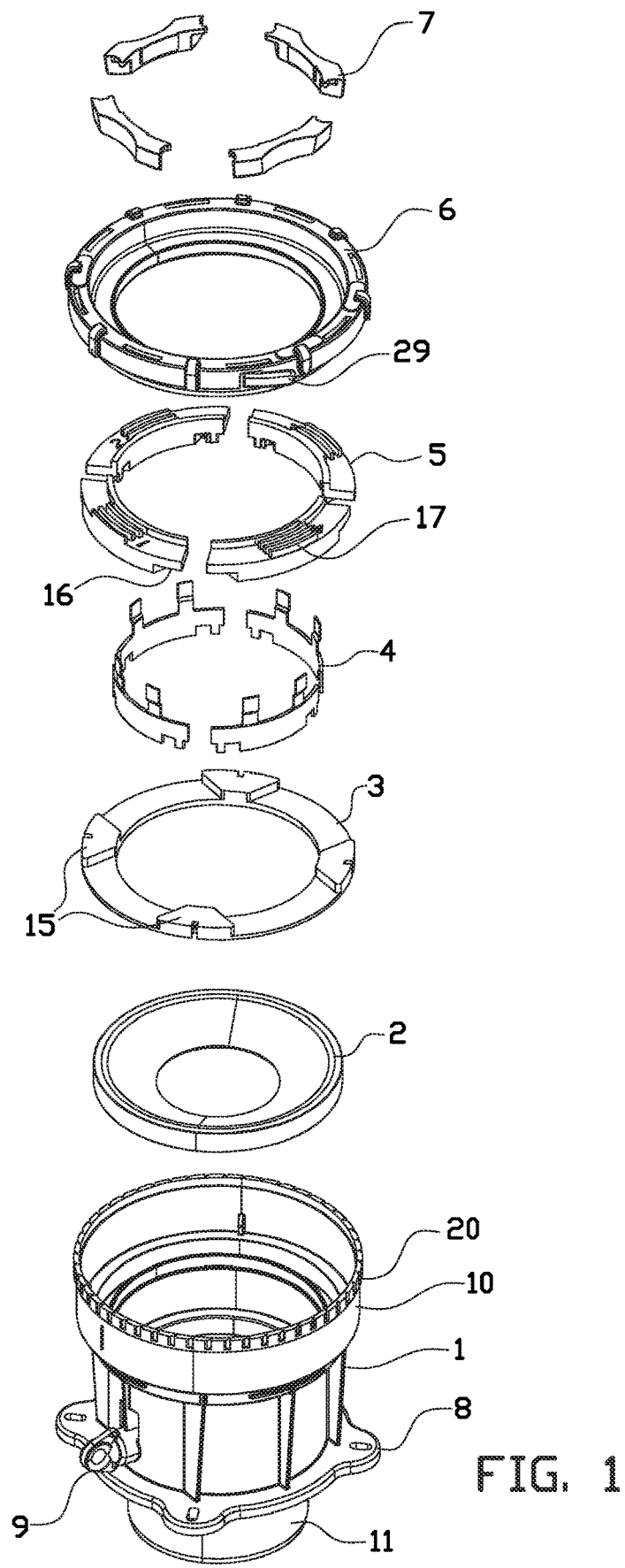
FIG. 1 shows an exploded view of an exemplary embodiment of the adjustable collar of the invention.
Figure 6A:
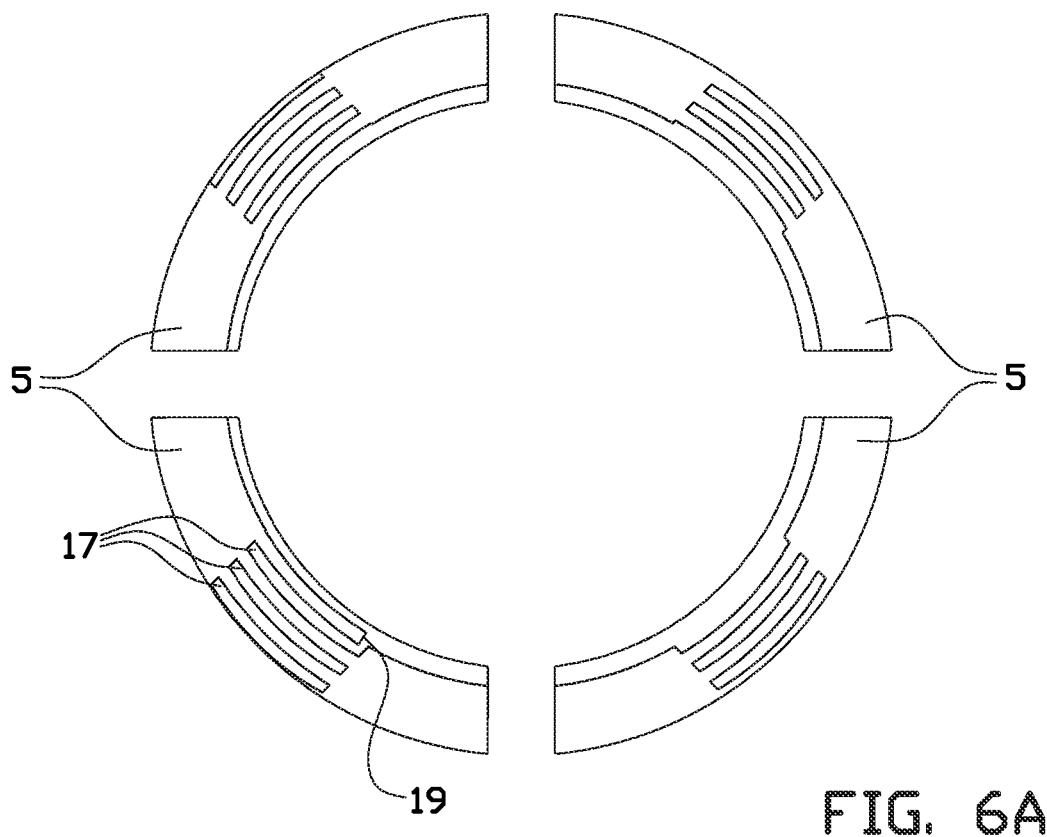
Figure 6B:
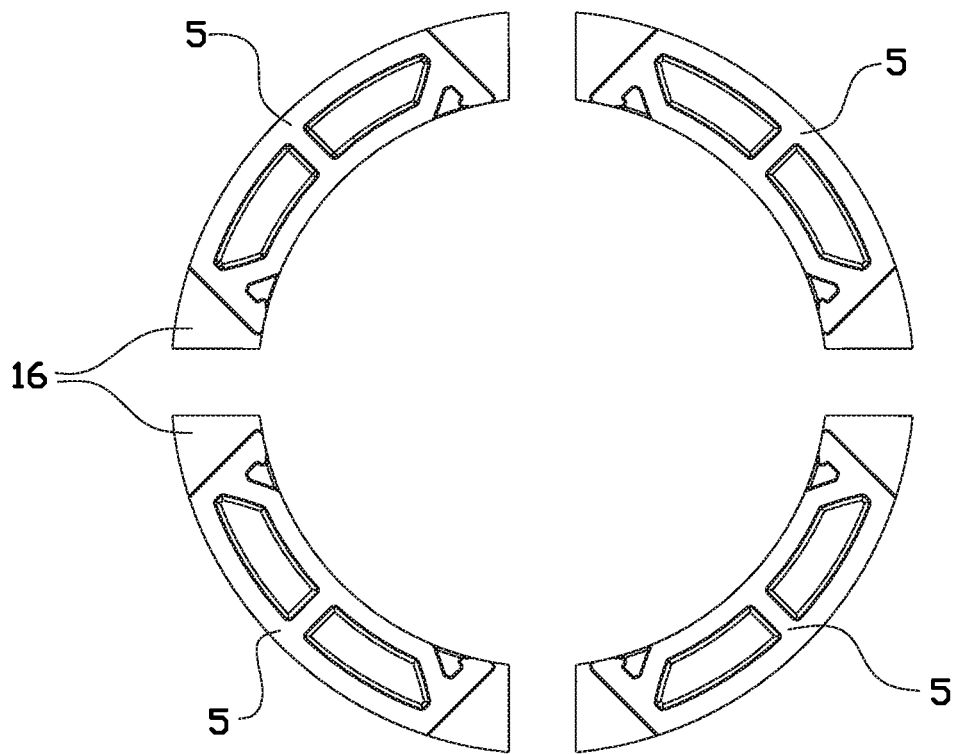

FIG. 6 shows a detailed representation of the sizing clamps of FIG. 1. FIG. 6A shows a top view. FIG. 6B shows a bottom view.

Figure 7:
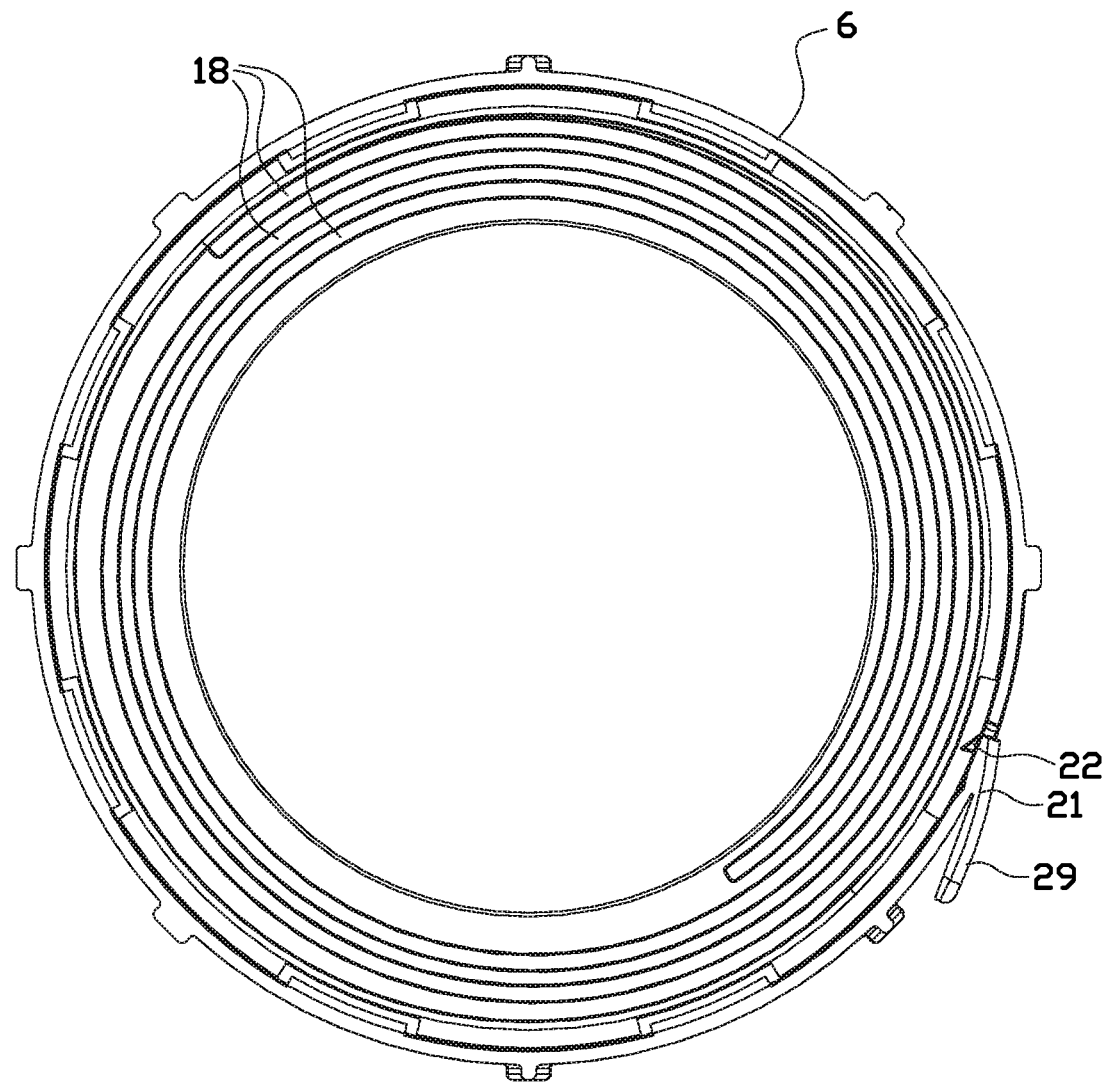

FIG. 7 shows a bottom view of the control ring shown in FIG. 1.

Figure 8:
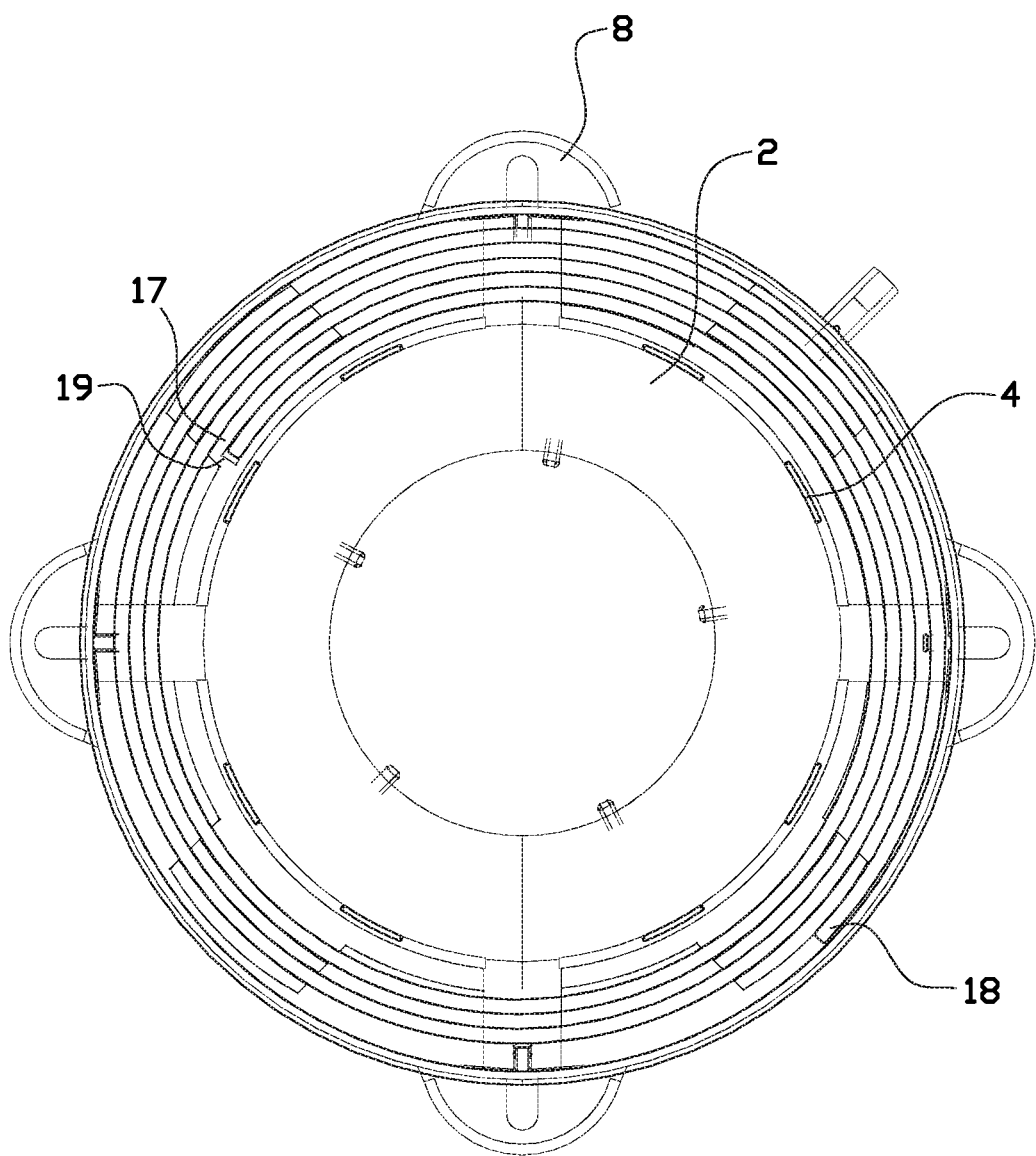

FIG. 8 shows top view of a cross-section in the plane perpendicular to the longitudinal axis of the housing of the contacting end of the control ring and the contacting end of the sizing clamps at the position where the spiral guide track of the control ring engages the cooperative guide followers of the sizing clamps.

Figure 4:
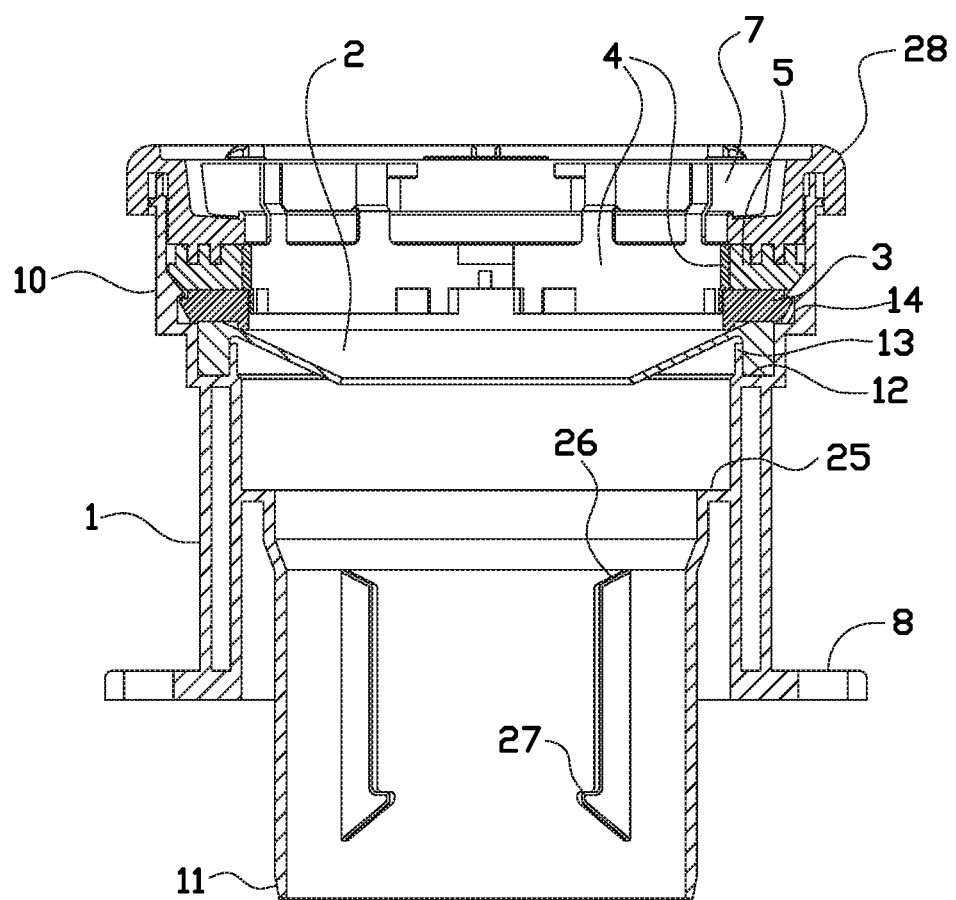
FIG. 4 shows a cross section of the exemplary embodiment of the adjustable collar of the invention shown in FIGS. 2 and 3 along line IV.
Figure 9:
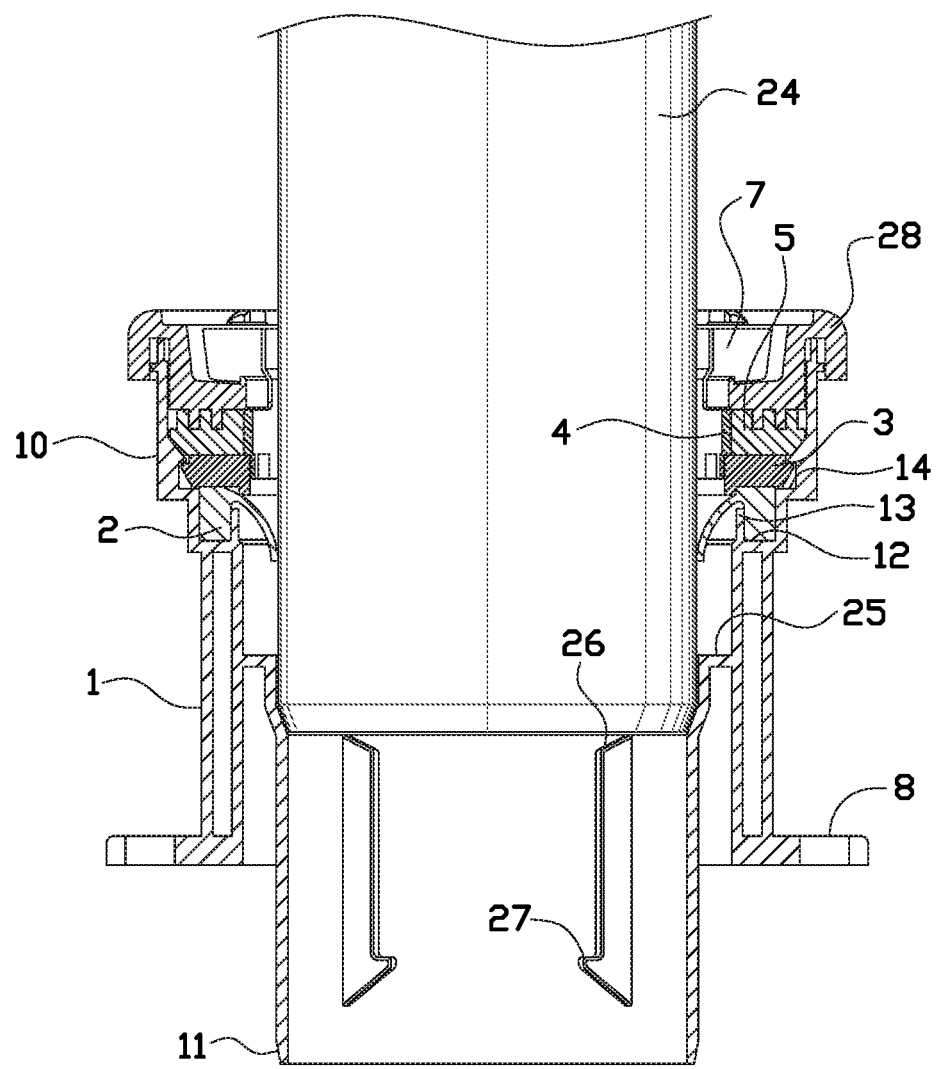

FIG. 9 shows the cross section of FIG. 4 with a pipe inserted in the adjustable collar in loosened position.

Figure 10:
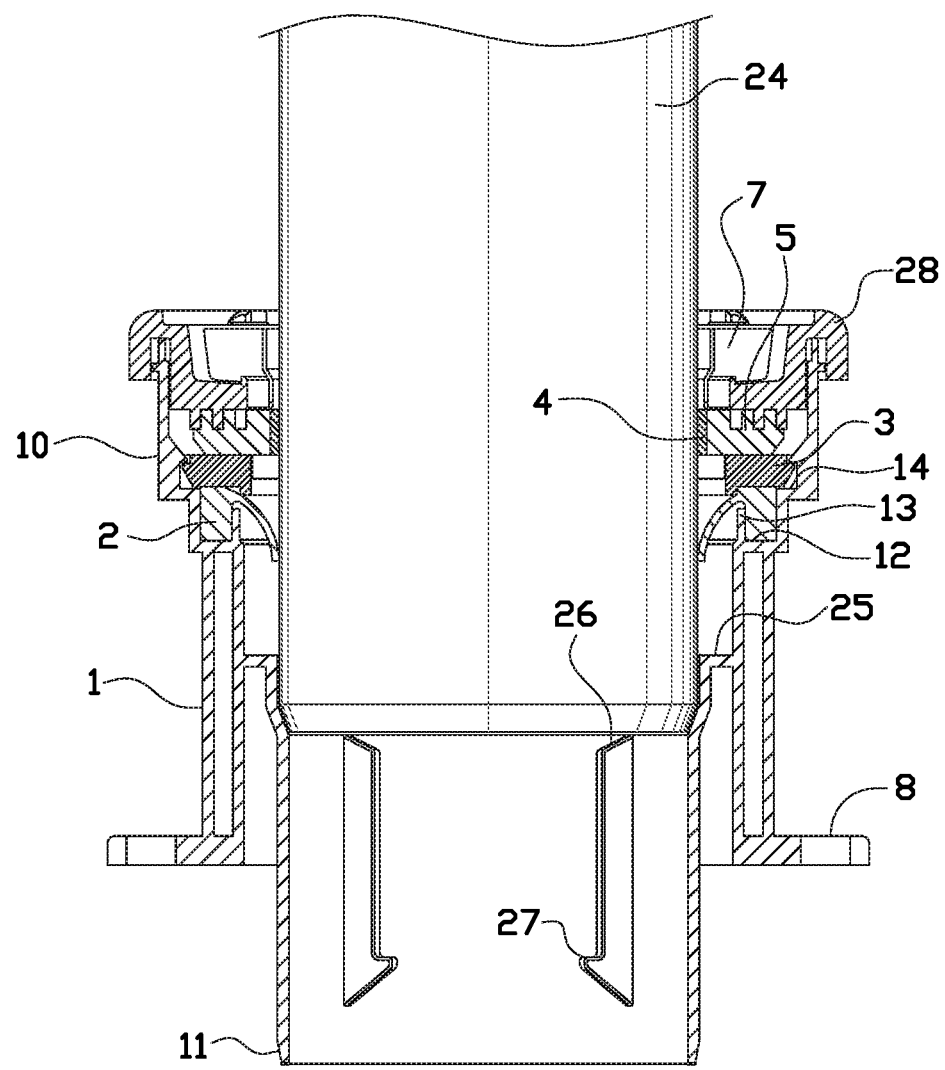

FIG. 10 shows the cross section of FIG. 4 with a pipe inserted in the adjustable collar in tightened position.

DETAILED DESCRIPTION OF THE INVENTION

The present invention relates to an adjustable collar which can position and clamp pipes of various diameters to an apparatus. The invention is based on the provision of a twist lock mechanism at an end of a housing. This mechanism comprises a control ring which is in contact with at least two sizing clamps, and by which the clamps can be forced into the interior of the housing so as to clamp a pipe that is inserted in the housing. This mechanism is realized by the provision of a spiral guide track on one of the contacting ends of the control ring and sizing clamps and the provision of cooperative guide followers on the other of the contacting ends. At the contacting ends the spiral guide track engages the cooperative guide followers.

The first (female) end of the housing is designed to accommodate the control ring and sizing clamps, and optional further elements and to insert pipes of various diameters therein. The second (male) end can be designed in different diameters depending on the intended use. This may for instance be dependent on an apparatus to which the second end is to be coupled.

Either the contacting end of the control ring or the the contacting end of the sizing clamps may be provided with said spiral guide track provided that the other contacting end is provided with cooperative guide followers. Because the sizing clamps are allowed to move radially and the control ring has a fixed shape and diameter, rotating the ring in a direction transverse to the longitudinal axis of the housing, will guide the cooperative guide followers along the spiral track thereby achieving radial movement (i.e. in a direction transverse to the longitudinal axis of the collar) of the sizing clamps to or from the centre of the collar housing. Depending on the rotating direction this radial movement will be either inward to the inside of the housing (to fasten a pipe) or in the direction of the inner wall of the housing (to loosen a pipe).

Because the control ring has a continuous contact end and the contact end of the clamps together is discontinuous, it is preferred that at the contact side of said control ring and sizing clamps, the contacting end of the control ring is provided with a spiral guide track and the contacting end of the sizing clamps is provided with cooperative guide followers. In this embodiment rotating the control ring in a direction perpendicular to the longitudinal axis of the housing will result in the cooperative guide followers of the sizing clamps being guided along the spiral track of the control ring, leading to radial movement of the sizing clamps.

The choice of orientation of the spiral guide track determines the required twisting direction for fastening and loosening. It is preferred that the spiral guide track is designed such that clockwise rotation of the control ring results in inward radial movement of the sizing clamps and therefore in fastening a pipe inserted into the housing, because it is common practice in the field of construction to apply clockwise rotation for fastening. In this embodiment counter-clockwise rotation of the control ring results in outward radial movement of the sizing clamps and therefore in loosening a pipe inserted into the housing. In other words: clockwise for tightening and counter-clockwise for loosening.

With the control ring of the collar of the present invention pipes can be secured into the adjustable collar according to the invention by turning the control ring by hand without the need for hand tools, adapters, or other accessories.

The collar of the invention comprises two or more sizing clamps, such as 2, 3 or 4 sizing clamps. In particularly suitable embodiments the collar comprises two sizing clamps of equal dimensions, or four sizing clamps of equal dimensions.

The sizing clamps may comprise additional means to engage a pipe. In a preferred embodiment the surface of the sizing clamps facing the inside of the housing comprises soft grip pads, for instance of rubber. This enables the installer to exercise sufficient holding force without the risk of damaging the pipe. Furthermore this causes friction between the inserted pipe and the clamps, thereby further tightening and securing the pipe into the adjustable cover of the invention.

The collar of the invention comprises one or more clamp guides configured to receive the sizing clamps and to guide the sizing clamps through an allowed movement range. The clamp guide or guides may be an integral part of the housing, such as a seating which together with the wall of the housing serves as guide. Such a seating may for instance be provided with protrusions designed to receive corresponding indentations of the sizing clamps. The clamp guide or guides may also be provided as one or more separate elements mounted at the end of the housing at which the sizing clamps and control ring are mounted. Also in this case, the clamp guide or guides may for instance be provided with protrusions designed to receive corresponding indentations of the sizing clamps. The clamps may then move along the protrusions which define the allowed movement range of the sizing clamps.

Preferably, the sizing clamps also have integrated stops which limit them from moving beyond a certain point inward, for instance the distance between adjacent sizing elements may define a limit for moving movement of the sizing clamps and/or the spiral guide track and/or cooperative guide followers may be provided with a stop.

In a suitable embodiment the collar is arranged in a setup from the top of the first end of the housing comprising a control ring mounted onto the sizing clamps, the sizing clamps being mounted onto the one or more clamp guides.

The adjustable collar preferably also comprises securing means for securing and desecuring the clamps in and from a radial position. This way outward movement of the clamps is prevented so that an inserted pipe is secured into the housing. In a preferred embodiment said securing means is a diameter indicating safety lock.

The securing means may suitably be provided on the control ring and interact with the housing or the sizing clamps to secure the sizing clamps in a certain position. In a preferred embodiment, the securing means may be provided on the control ring and interact with securing elements on the housing to secure the control ring in a certain position. This way, when a pipe is inserted into the housing, inward movement of the sizing clamps is prevented by the pipe and outward movement of the sizing clamps is prevented by the secured control ring. For this purpose the control ring may be provided with a locking element having a part, such as a hook element, engaging regularly distributed indentations on the outer surface of the housing and arranged in such a manner that movement of the control ring relative to the housing in a direction that results in fastening a pipe into the housing is possible, while movement in the other direction is not possible unless the part engaging said indentations is lifted from the indentations, for instance by pushing or pulling a tab exposed on the outer surface of the control ring. The aforementioned indentations may be realized by providing the end of the housing engaging the control ring with regularly distributed ledges or teeth on the outer surface. The diameter enclosed by the sizing clamps may be indicated based on the position of the lock element with respect to the outer surface of the housing.

In preferred embodiment, the adjustable collar according to the invention comprises an adjustable seal arranged inside the housing. The seal is preferably arranged as a flexible flange which circumferentially protrudes from the inner wall of the housing to the inside and which has an opening through which a pipe can be inserted. The opening should be designed such that also smaller pipes are sealed and the material should be sufficiently flexible to allow insertion of larger diameter pipes. This way the adjustable seal functions as a single gasket for pipes of various diameters, so that industry sealing standards can be complied with. Suitable adjustable seals may be realized in the form of an elastic flange circumferentially protruding from the inner wall of the housing to the inside of the housing with a central opening for inserting a pipe. Such flanges may for instance be made of rubber. Such flanges are capable of forming a uniform seal around a pipe. The adjustable seal may suitably be mounted between a seating on the inside of the housing and the clamps, such as between a seating on the inside of the housing and the clamp guide if one or more separate clamp guides are applied. The adjustable seal ensures that the engagement of the pipe with the adjustable collar of the invention is substantially gas tight so that no gas moving through an inserted pipe and the collar of the invention is able to escape between the seal and the pipe.

In a preferred embodiment the adjustable collar according to the invention comprises in the housing a number of seating means, arranged stepwise from the first open end of the housing in the direction of the second open end to accommodate pipes of decreasing diameter in the housing. This way guidance is provided for pipes of different diameters. The seatings enable the pipe to be inserted from the first open end of the housing through the control ring and clamps to a suitable predetermined depth. This also improves securing the pipe into the collar of the invention and facilitates construction. These seatings may be provided as continuous circular seatings in the inner circumference of the housing and/or as separate seatings distributed in said inner circumference.

Accordingly, the housing may also comprise further seatings for accommodating the adjustable seal, and for accommodating the clamp guide or guides (if provided separately), the sizing clamps and the control ring. These seatings are suitably configured as continuous circular seatings in the inner circumference of the housing's first end.

The adjustable collar according to the invention may be equipped with optional features for various purposes.

Optionally, the adjustable collar of the invention may further comprise spacer elements mounted onto the control ring to allow for an extended clamping range. This allows to clamp also pipes of small diameter size in a tight and secured way over a longer stretch of a pipe so that sideward bending of these pipes is minimized. This on its turn prevents leaking of gases from the collar.

For instance, in an advantageous embodiment the adjustable collar according to the invention may comprise a non-return valve inside the housing. This prevents flow of gas back into the apparatus to which the collar is mounted.

In a further advantageous embodiment the adjustable collar according to the invention comprises a test port integrated into the housing. This test port allows easy access to the inside of the collar without affecting the pipe inserted into the collar. This is particularly advantageous if an installer wishes to asses a flue gas composition if the collar is mounted to a flue gas outlet.

In this respect, although the adjustable collar is suitable for connecting pipes of various diameters in various settings and construction, the adjustable collar according to the invention is in particular suitable as an adapter for a flue gas outlet.

When in use, the adjustable collar may suitable be mounted to an apparatus. In a further advantageous embodiment the adjustable collar according to the invention may comprise one or more mounting flanges on the outside of the housing, for instance a circumferential mounting flange. This enables mounting the collar to an apparatus without the need for separate mounting plates. The mounting flanges also make it possible to "flush mount" the collar housing to an apparatus cabinet, meaning that the housing is partially sunk into the apparatus cabinet, leaving a small portion of the housing, namely the portion with the control ring, exposed and directly accessible to an installer. Of course it is also possible to surface mount the adjustable collar of the invention to an apparatus cabinet. The fact that the collar of the invention can be mounted internally or externally onto an apparatus, also gives the ability to have an internal or external test port.

The components of the adjustable collar may be made of any suitable material or materials. For instance the housing, sizing clamps, control ring and clamp guide(s) may be made from conventional materials in the field of installation technique such as plastic, for instance PP or PVC, aluminum or steel, which are all durable materials. The components of the adjustable collar of the invention may be produced by any suitable molding technique, but may also be made by 3D printing. In this respect, the invention also relates to a computer-readable medium having computer-executable instructions adapted to cause a 3D printer to print the adjustable collar. It is well known in the art how to compose such instructions on the basis of 3D design drawing.

DETAILED DESCRIPTION OF THE DRAWINGS

The invention will now be further elucidated in the attached drawings. The following explanation is meant to illustrate and explain the invention and not to limit the claims.

FIG. 1 shows an exploded view of an exemplary embodiment of the adjustable collar of the invention to show the components of this collar. The adjustable collar of this exemplary embodiment comprises a housing 1, an adjustable flexible rubber seal 2, a clamp guide 3, four rubber grip pads 4, four sizing clamps 5, a control ring 6 and spacer elements 7.

The housing comprises on its outside a circumferential mounting flange 8. This enables mounting the collar to an apparatus without the need for separate mounting plates. Also on its outside, housing 1 comprises an external test port 9. Test port 9 allows access to the inside of a pipe when inserted into the collar without affecting the pipe. The housing comprises a first (female) end 10 and a second (male) end 11. The male end 11 can be designed in different diameters depending on the intended use, for instance dependent on the apparatus to which the male end 11 is to be coupled.

Referring now to FIGS. 2-8, it is shown how the adjustable collar of this embodiment is mounted. The adjustable flexible rubber seal 2 is mounted on the inside of the first end 10 of the housing and rests on seating 12. Seal 2 circumferentially protrudes from the inner wall of the housing to the inside of the housing with a central opening for inserting a pipe. Inward slipping of seal 2 is prevented by the provision of wall portion 13 projecting from the inner edge of seating 12.

Clamp guide 3 is mounted onto seal 2 on the inside of the first end 10 of the housing and rest partially on the upper edge of the seal and for another part on seating 14.

This way seating 12, wall portion 13 and clamp guide 3 lock seal 2 in a fixed position.

Clamp guide 3 is designed to accommodate the sizing clamps 5. As shown in FIG. 1, the upper surface of clamp guide 3 is provided with projecting surfaces 15 with a tapered shape from the outside to the inside. Accordingly, the lower surface of sizing clamps 5 as shown in FIG. 6B which shows a bottom view of sizing clamps 5, is provided with recesses 16 at their sides designed to fit into said projecting surfaces 15 of clamp guides 3. This ensures that the sizing clamps 5 can only move through an allowed movement range.

Control ring 6 is mounted onto sizing clamps 5. As shown in FIG. 1 and FIG. 6A sizing clamps 5 are provided with guide followers 17. These are designed such that when control ring 6 is mounted onto sizing clamps 5 they are capable to cooperate with, i.e. engage the spiral guide track 18 of control ring 6 as shown in FIG. 7, in which a bottom view of the control ring 6 shown in FIG. 1 is depicted.

The sizing clamps 5 also have an integrated stop 19 which limits them from moving beyond a certain point inward as shown in FIG. 6A.

How the spiral guide track 18 of the control ring engages the cooperative guide followers 17 of the sizing clamps is shown in FIG. 8, which shows a top view of the contacting end of the control ring 6 and the contacting end of the sizing clamps 5 at which the spiral guide track of the control ring 6 engages the cooperative guide followers 17 of the sizing clamps 5.

In the present embodiment the control ring is provided with a U-shaped upper lip 28 which overhangs the upper edge of the first end 10 of housing 1. The outer surface of this edge is provided with regularly distributed teeth 20 on the outer surface as shown in FIG. 1 and in more detail in FIGS. 5 A and B. The overhanging part of the control ring 6 comprises a securing means in the form of a lock element 21 having a hook element 22 which fits in indentations 23 between teeth 20 on the outer surface of the housing as shown in FIG. 5A. The hook element 22 keeps the control ring locked at a certain position with respect to the housing and thereby also keeps the sizing clamps locked at a certain position. In the present embodiment the sizing clamps 5 move inward when the control ring is rotated in a clockwise direction. As shown in FIG. 5A, the above mentioned hook element 22 and teeth 20 are therefore designed in such a manner that clockwise rotation of the control ring 6 can take place and that counter-clockwise rotation (and thus outward movement of the sizing clamps 5), so that when a pipe is inserted into the adjustable collar, the pipe is secured well. The safety lock element 21 ensures that a pipe cannot be loosened until this lock is released by pushing on the tab 29. If the pipe is to be loosened or if the sizing clamps have to move outward in the direction of the housing wall for some other reason, the tab 29 of the lock element 21 may be pushed down. This results in lifting the hook element 22 from the indentation between the teeth 20 in which it is locked and enables an installer to rotate the control ring counter-clockwise, resulting in outward moving of the sizing clamps in the direction of the wall of housing 1.

As shown in FIG. 9, a pipe 24 can be inserted when the sizing clamps are in position close to the inner wall of the housing. The housing 1 comprises a number of seatings 25, 26, 27 arranged stepwise from the first open end of the housing to the second open end to accommodate pipes of decreasing diameter in the housing. These seatings enable the pipe to be inserted from the first open end of the housing through the control ring and clamps to a suitable predetermined depth. This also improves securing the pipe into the collar of the invention and facilitates construction. In the present embodiment pipe 24 rests on seating 26. Upon clockwise rotation of the control ring 6, the sizing clamps 5 move inward and clamp and secure and the pipe 24 in the housing. Turning the control ring 6 clockwise thus positions and clamps the pipe between the sizing clamps 5. This leads to the situation shown in FIG. 10, wherein in pipe is sealed, secured and clamped into the adjustable collar.

In the present embodiment spacers 7 are attached to the control ring. These spacers 7 are an optional attachment, mounting to the diameter sizing clamps 5 to allow for an extended clamping range grip.

Furthermore, grip pads 4 are provided to cover the surface of the sizing clamps 5 that is directed to the outer surface of the pipe 24. Also the spacers 7 may be partially covered by the grip pads 4. Grip pads 4 enable the installer to exercise sufficient holding force without the risk of damaging pipe 24. Furthermore this causes friction between the inserted pipe and the clamps, thereby further tightening and securing the pipe into the adjustable cover of the invention.

Rotating the control ring counter-clockwise (while pushing tab 29 of tab element 21) removes clamping force and allows easy removal of the pipe.

Having described and illustrated the principles of the present invention in the detailed description and accompanying drawings, it will be recognized that the various embodiments can be modified in arrangement and detail without departing from these principles. Furthermore, any features or aspects of the disclosed embodiments can be used in various combinations and subcombinations with one another.

The invention claimed is:

1. An adjustable collar for inserting a pipe therein, comprising
    a housing with a first open end and a second open end;
    at least two sizing clamps, radially movably mounted at said first open end, and having a first end and a second end;
    a control ring rotatably mounted at said first open end, and having a first end and a second end; and
    one or more clamp guides configured to receive the sizing clamps and defining an allowed movement range for the sizing clamps;
    wherein one of the first and second ends of the control ring and one of the first and second ends of the sizing clamps are in contact with each other, wherein at the contact side of said control ring and sizing clamps, one of the contacting ends of the control ring and sizing clamps is provided with a spiral guide track and the other is provided with cooperative guide followers.

2. The adjustable collar according to claim 1, wherein at the contact side of said control ring and sizing clamps, the contacting end of the control ring is provided with a spiral guide track and the contacting end of the sizing clamps is provided with cooperative guide followers.

3. The adjustable collar according to claim 1, further comprising spacer elements mounted onto control ring to allow for an extended clamping range.

4. The adjustable collar according to claim 1, which comprises an adjustable seal arranged inside the housing.

5. The adjustable collar according to claim 1, wherein the housing comprises a number of seats, arranged stepwise from the first open end of the housing in the direction of the second open end to accommodate pipes of decreasing diameter in the housing.

6. The adjustable collar according to claim 1, which comprises a locking element for securing and desecuring the clamps in and from a radial position.

7. The adjustable collar according to claim 1, wherein said locking element is a diameter indicating safety lock.

8. The adjustable collar according to claim 1, further comprising a non-return valve inside the housing.

9. The adjustable collar according to claim 1, further comprising a test port integrated into the housing.

10. The adjustable collar according to claim 1, which is an adapter for a flue gas outlet.

11. Computer-readable medium having computer-executable instructions adapted to cause a 3D printer to print the adjustable collar according to claim 1.

12. The adjustable collar according to claim 1, which is mounted to an apparatus.

\* \* \* \* \*